United States Patent
Bae

(10) Patent No.: US 9,113,201 B2
(45) Date of Patent: Aug. 18, 2015

(54) BROADCAST RECEIVING DEVICE AND METHOD

(75) Inventor: Gun-young Bae, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 13/537,128

(22) Filed: Jun. 29, 2012

(65) Prior Publication Data

US 2013/0051464 A1 Feb. 28, 2013

(30) Foreign Application Priority Data

Aug. 31, 2011 (KR) .................. 10-2011-0088101

(51) Int. Cl.
| | |
|---|---|
| *H04N 7/32* | (2006.01) |
| *H04N 21/438* | (2011.01) |
| *H04N 21/433* | (2011.01) |
| *H04N 21/63* | (2011.01) |
| *H04N 21/845* | (2011.01) |

(52) U.S. Cl.
CPC ....... *H04N 21/4384* (2013.01); *H04N 21/4331* (2013.01); *H04N 21/632* (2013.01); *H04N 21/8453* (2013.01)

(58) Field of Classification Search
CPC .......... H04N 21/4384; H04N 21/8453; H04N 21/632; H04N 21/4331; H04N 19/00781; H04N 19/00569; H04N 19/00696
USPC ................................... 375/240.12
See application file for complete search history.

(56) References Cited

U.S. PATENT DOCUMENTS

| | | | | | |
|---|---|---|---|---|---|
| 5,585,866 | A | * | 12/1996 | Miller et al. .................... | 725/43 |
| 5,625,350 | A | * | 4/1997 | Fukatsu et al. ............... | 340/4.41 |
| 5,649,284 | A | * | 7/1997 | Yoshinobu .................... | 725/114 |
| 5,694,173 | A | * | 12/1997 | Kimura et al. ............. | 348/423.1 |
| 7,814,510 | B1 | * | 10/2010 | Ergen et al. ...................... | 725/38 |
| 8,719,340 | B2 | * | 5/2014 | Ushioda et al. ............... | 709/203 |
| 8,782,309 | B2 | * | 7/2014 | Pugsley et al. .................. | 710/74 |
| 2002/0019984 | A1 | * | 2/2002 | Rakib .......................... | 725/111 |
| 2002/0129374 | A1 | * | 9/2002 | Freeman et al. ................ | 725/91 |
| 2003/0026364 | A1 | * | 2/2003 | Adachi ......................... | 375/345 |

(Continued)

FOREIGN PATENT DOCUMENTS

| | | |
|---|---|---|
| EP | 1993289 A1 | 11/2008 |
| KR | 1020090039217 A | 4/2009 |

OTHER PUBLICATIONS

Communication dated Dec. 7, 2012 issued by the European Patent Office in counterpart European Application No. 12160803.8.

*Primary Examiner* — Shan Elahi

(74) *Attorney, Agent, or Firm* — Sughrue Mion, PLLC

(57) ABSTRACT

A broadcast receiving device and method are provided. The broadcast receiving device includes a receiving unit which selects a channel and receives a first broadcast signal that includes a plurality of frames, a signal processing unit which processes the first broadcast signal, a control unit which controls the receiving unit to select another channel when a channel change command is input, a communication unit which receives from an external device at least one reference frame used to decode a frame, which corresponds to a time when the channel change command was input, from among frames of a second broadcast signal received from the another channel, and a storage unit which stores the at least one reference frame. When the channel change command is input, the signal processing unit decodes the frames of the second broadcast signal by using the at least one reference frame.

15 Claims, 7 Drawing Sheets

(56) References Cited

U.S. PATENT DOCUMENTS

| | | | |
|---|---|---|---|
| 2003/0121045 A1* | 6/2003 | Cho | 725/90 |
| 2004/0242150 A1* | 12/2004 | Wright et al. | 455/3.02 |
| 2005/0193408 A1* | 9/2005 | Sull et al. | 725/32 |
| 2005/0193425 A1* | 9/2005 | Sull et al. | 725/135 |
| 2006/0253330 A1* | 11/2006 | Maggio et al. | 705/14 |
| 2007/0130603 A1* | 6/2007 | Isomura et al. | 725/131 |
| 2007/0168188 A1* | 7/2007 | Choi | 704/211 |
| 2008/0046934 A1* | 2/2008 | Lim | 725/73 |
| 2008/0107392 A1* | 5/2008 | Grannan et al. | 386/83 |
| 2008/0120424 A1* | 5/2008 | Deshpande | 709/230 |
| 2008/0267210 A1* | 10/2008 | Sidana | 370/449 |
| 2009/0013355 A1* | 1/2009 | Han | 725/58 |
| 2009/0100477 A1* | 4/2009 | Jeffs | 725/86 |
| 2009/0104871 A1 | 4/2009 | Cho | |
| 2009/0138931 A1* | 5/2009 | Lin et al. | 725/115 |
| 2009/0254964 A1* | 10/2009 | Park et al. | 725/134 |
| 2010/0235874 A1* | 9/2010 | Johnson et al. | 725/109 |
| 2010/0302444 A1* | 12/2010 | Ahn et al. | 348/569 |
| 2011/0119611 A1* | 5/2011 | Ahn et al. | 715/769 |
| 2011/0134738 A1* | 6/2011 | Pugsley et al. | 369/83 |
| 2012/0011558 A1* | 1/2012 | Maddali et al. | 725/131 |
| 2012/0036549 A1* | 2/2012 | Patel et al. | 725/153 |

\* cited by examiner

BROADCAST RECEIVING DEVICE AND METHOD

CROSS-REFERENCE TO RELATED APPLICATIONS

This application claims priority from Korean Patent Application No. 2011-0088101, filed on Aug. 31, 2011, in the Korean Intellectual Property Office, the disclosure of which is incorporated herein by reference in its entirety.

BACKGROUND

1. Field

Methods and apparatuses consistent with exemplary embodiments described herein relate to a broadcast receiving device and method, and more particularly, to a broadcast receiving device and method which can be used to change channels quickly.

2. Description of the Related Art

Generally, digital broadcast receiving devices, such as digital televisions (TVs) and Internet protocol (IP) TVs, provide better image and sound quality than analog broadcast receiving devices. However, digital broadcasting receiving devices require a longer time to change from a currently selected channel to a channel requested by a user than analog broadcast receiving devices.

When a channel change command is received from a user while a broadcast signal of a selected channel is being displayed on the screen, the time required for a radio frequency (RF) tuner to tune to a channel requested by the user is all of the time that an analog broadcast receiving device needs to change to the requested channel.

By contrast, when a channel change command is received from a user while a broadcast signal of a selected channel is being displayed on the screen, a digital broadcast receiving device typically requires about one or two seconds more time than an analog broadcast receiving device to receive a broadcast signal of a channel requested by the user and to display the received broadcast signal on the screen. Specifically, the time required by the digital broadcast receiving device to change to the channel corresponding to the channel change command received from the user includes the time required for an RF tuner to tune to the requested channel, the time required until an intra (I) picture is received after the change to the requested channel, and the time required to buffer a predetermined number of frames in a group of pictures (GOP) that includes the received I picture.

A moving image that is compressed using digital image compression technology, such as, for example, Moving Picture Experts Group 2 (MPEG2) or H.264, typically consists of a plurality of groups of pictures (GOPs), each GOP including I, predictive (P), and bidirectionally predictive (B) pictures. A digital broadcast receiving device buffers such a moving image on a GOP-by-GOP basis. After buffering all frames (i.e., pictures) in a GOP, the digital broadcast receiving device decodes the frames in the GOP, so that the frames can be displayed on the screen.

While an image of a selected channel is being displayed, if channel change command information is received from a user, the digital broadcast receiving device enters a standby mode until it receives an I picture of a channel corresponding to the channel change command information received from the user. Then, the digital broadcasting receiving device buffers all frames in a GOP, including the received I picture. After buffering all frames in the GOP, the digital broadcast receiving device decodes the frames in the GOP and displays the decoded frames on the screen.

As described above, to change from a currently selected channel to another channel requested by a user, a digital broadcast receiving device requires the time that elapses until an I picture of the requested channel is received, plus the time that elapses while buffering all frames in a GOP including the I picture, plus the time that elapses while decoding the buffered frames so that the decoded frames can be displayed on the screen. Hence, the user experiences a delay, and therefore cannot watch a moving image of the requested channel more immediately.

SUMMARY OF THE INVENTION

In one aspect, one or more exemplary embodiments may reduce the time required to change from a currently selected channel to another channel.

A broadcast receiving device, according to an exemplary embodiment, includes a receiving unit which selects a channel and receives a first broadcast signal that includes a plurality of frames, a signal processing unit which processes the first broadcast signal, a control unit which controls the receiving unit to select another channel when a channel change command is received, a communication unit which receives, from an external device, at least one reference frame from among frames of a second broadcast signal received from the another channel, and a storage unit which stores the received at least one reference frame. The at least one reference frame relates to a frame from the first broadcast signal that corresponds to a time when the channel change command was received. When the channel change command is received, the signal processing unit decodes the frames of the second broadcast signal by using the at least one reference frame.

The first broadcast signal may use digital image compression technology. The first broadcast signal may include a plurality of groups of pictures (GOPs), wherein each GOP includes at least one intra (I) picture, at least one predictive (P) picture, and at least one bidirectionally predictive (B) picture. When the frame corresponding to the time when the channel change command was received includes a P picture, the communication unit may receive one of an I picture located temporally before the included P picture in a corresponding GOP and another P picture as the at least one reference frame.

When the frame corresponding to the time when the channel change command was received includes a B picture, the communication unit may receive one of an I picture and a P picture located temporally before the B picture in the corresponding GOP as the at least one reference frame.

When the frame corresponding to the time when the channel change command was received includes an I picture, the communication unit may not receive the at least one reference frame from the external device.

When the channel change command is received, the control unit may search accessible external devices to determine an external device which has selected and is playing the another channel or which stores a reference frame of the another channel, and use the communication unit to request the at least one reference frame from the determined external device.

The control unit may search for and determine an external device which can provide the at least one reference frame of the another channel by checking channel selection information periodically received from external devices connected to the communication unit, and use the communication unit to request the at least one reference frame from the determined external device.

When the channel change command is received, the control unit may request information relating to an external device which can provide the reference frame of the another channel from a server, receive the requested information from the server, and use the communication unit to request the at least one reference frame from the external device corresponding to the received information.

The storage unit may include a first storage unit which stores the at least one reference frame and frames of a broadcast signal relating to the at least one reference frame, and a second storage unit which stores data processed by the signal processing unit. When a frame provision request is received from another broadcast receiving device, the control unit may control the communication unit to extract an encoded reference frame relating to the received frame provision request from the data stored in the second storage unit, and to transmit the encoded reference frame to the another broadcast receiving device.

A broadcast receiving method, according to an exemplary embodiment, includes receiving a channel change command, selecting a channel based on the received channel change command, receiving a broadcast signal that includes a plurality of frames, receiving, from an external device, at least one reference frame from among the frames of the received broadcast signal, and decoding the frames of the received broadcast signal by using the received at least one reference frame. The at least one reference frame relates to a frame included in the broadcast signal that corresponds to a time when the channel change command was received.

The broadcast signal may use digital image compression technology. The broadcast signal may include a plurality of GOPs, wherein each GOP includes at least one I picture, at least one P picture, and at least one B picture.

The receiving of the at least one reference frame may include searching accessible external devices to determine an external device which has selected and is playing the channel or which stores a reference frame of the channel when the channel change command is received, and requesting the at least one reference frame from the determined external device.

The receiving of the at least one reference frame may include searching for and determining an external device which can provide the at least one reference frame of the channel by checking channel selection information periodically received from external devices when the channel change command is received, and requesting the at least one reference frame from the determined external device.

The receiving of the at least one reference frame may include requesting information relating to an external device which can provide the at least one reference frame of the channel from a server when the channel change command is received, receiving the requested information from the server, and requesting the at least one reference frame from the external device corresponding to the received information.

The requesting the at least one reference frame from the determined external device may include: when the frame corresponding to the time when the channel change command was received includes a P picture, requesting one of an I picture located temporally before the included P picture in a corresponding GOP and another P picture from the determined external device.

The requesting the at least one reference frame from the determined external device may include: when the frame corresponding to the time when the channel change command was received includes a B picture, requesting one of an I picture and a P picture located temporally before the included B picture in the corresponding GOP from the determined external device.

The broadcast receiving method may further include extracting an encoded reference frame relating to a frame provision request from stored data when the frame provision request is received from another broadcast receiving device, and transmitting the extracted reference frame to the another broadcast receiving device.

In another aspect, there is provided a non-transitory computer-readable recording medium on which a program for executing a channel changing method for use by a broadcast receiving device is recorded, according to an exemplary embodiment. The channel changing method includes receiving a channel change command, selecting a channel based on the received channel change command, receiving a broadcast signal that includes a plurality of frames, receiving, from an external device, at least one reference frame from among the frames of the received broadcast signal, and decoding the frames of the received broadcast signal by using the received at least one reference frame. The at least one reference signal relates to a frame that corresponds to a time when the channel change command was received.

The broadcast signal may use digital image compression technology. The broadcast signal may include a plurality of GOPs, wherein each GOP includes at least one I picture, at least one P picture, and at least one B picture. The channel changing method may include, when the frame corresponding to the time when the channel change command was received includes a P picture, requesting one of an I picture located temporally before the included P picture in a corresponding GOP and another P picture from the external device, and, when the frame corresponding to the time when the channel change command was received includes a B picture, requesting one of an I picture and a P picture located temporally before the included B picture in the corresponding GOP from the external device.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION

Certain exemplary embodiments are described in greater detail below with reference to the accompanying drawings.

Figure 1:
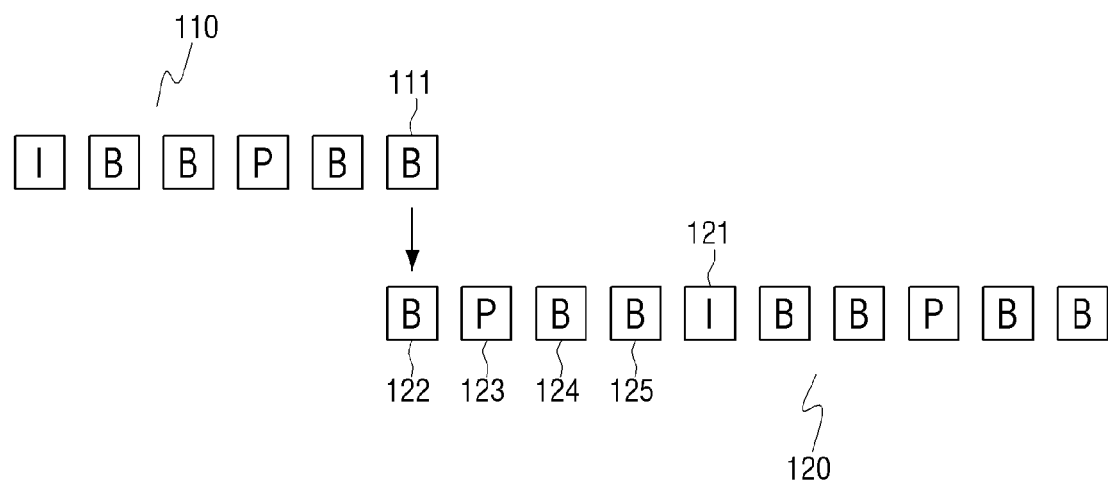
FIG. 1 is a diagram which illustrates the time taken for a conventional broadcast receiving device to change channels.

FIG. 1 is a diagram illustrating the time taken for a conventional broadcast receiving device to change channels.

Referring to FIG. 1, when a user inputs a command to change from a currently played channel to another channel, the time required for the conventional broadcast receiving device to output a broadcast signal of the another channel may be understood according to the following. For example, while a bidirectionally predictive (B) picture frame 111 from within a picture group 110 included in a broadcast signal related to a Seoul Broadcasting System (SBS) channel is being output, the user may input information for requesting a change to a Munhwa Broadcasting Corporation (MBC) channel. In this case, the conventional broadcast receiving device stands by until it receives an intra (I) picture 121 from within a picture group 120 included a broadcast signal related to the MBC channel while discarding received picture frames related to the MBC channel.

In particular, the conventional broadcast receiving device stands by while discarding a B picture frame 122, a P picture frame 123, a B picture frame 124 and a B picture frame 125, each of which is received before receiving the I picture 121. A picture group typically consists of 12 picture frames, and each picture frame in the picture group has a duration of approximately 33.4 ms to 40 ms. Therefore, referring again to the above example and FIG. 1, if the B picture frame 122, which is related to the MBC channel, is received after the user has input the information for requesting a change to the MBC channel at a time when the B picture frame 111, which is related to the broadcast signal of the SBS channel, was being output, then the conventional broadcast receiving device may be required to wait for up to 160 ms before receiving the I picture 121 which is related to the MBC channel.

Even if the conventional broadcast receiving device receives the I picture 121 in the picture group 120 of the broadcast signal related to the MBC channel after a time period of approximately 160 ms, the conventional broadcast receiving device is still required to wait without outputting the broadcast signal of the MBC channel until the picture group 120 which includes the I picture 121 is stored. Therefore, the conventional broadcast receiving device is unable to change channels quickly when information for requesting a change from a current (i.e., first) channel to another (i.e., second) channel is received. This is because the conventional broadcast receiving device has to wait until an I picture of the second channel is received and until a picture group of the second channel is stored. Accordingly, the channel changing operation of the conventional broadcast receiving device has been described above. Hereinafter, the channel changing operation of a broadcast receiving device according to one or more exemplary embodiments will be described.

Figure 2:
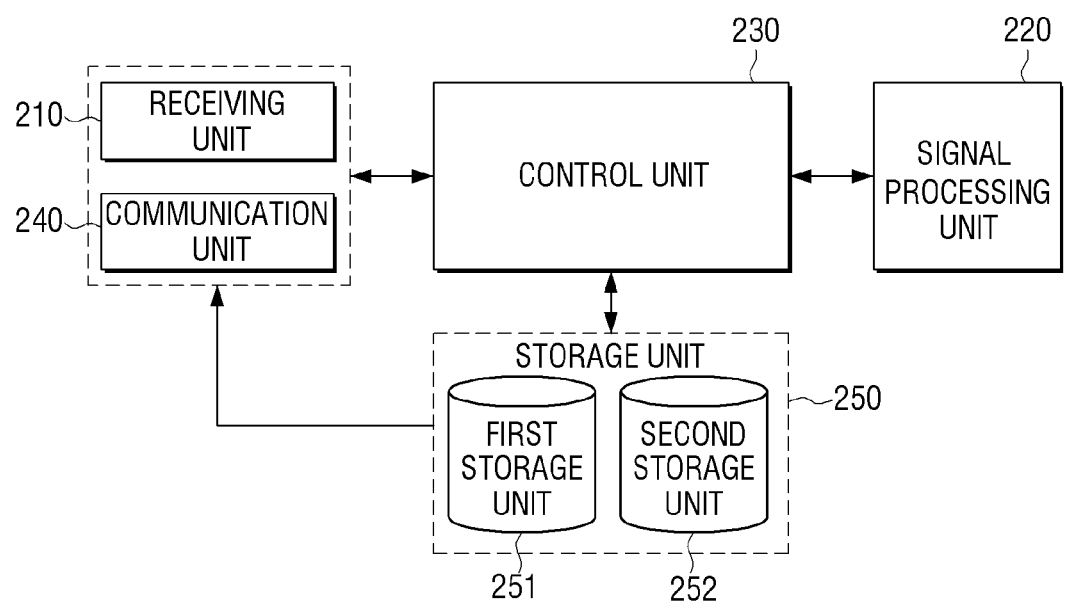
FIG. 2 is a block diagram of a broadcast receiving device according to an exemplary embodiment.

FIG. 2 is a block diagram of a broadcast receiving device according to an exemplary embodiment.

Referring to FIG. 2, the broadcast receiving device includes a receiving unit 210, a signal processing unit 220, a control unit 230, a communication unit 240, and a storage unit 250. The receiving unit 210 may be embodied, for example, as a receiver having one or more of an antenna, a digital tuner, and any hardware component or circuitry that is suitable for receiving a radio frequency (RF) signal. The signal processing unit 220 may be embodied, for example, as circuitry, an integrated circuit, a dedicated integrated circuit, firmware, a software module that includes computer-executable instructions for performing one or more signal processing functions, or any type of hardware processor that is capable of performing one or more signal processing functions. The control unit 230 may be embodied, for example, as circuitry, an integrated circuit, a dedicated integrated circuit, firmware, a microcomputer, a central processing unit (CPU), software, or any type of controller configured to perform the control functions described herein. The communication unit 240 may be embodied as, for example, a transceiver having one or more of an antenna, a digital tuner, and any hardware component or circuitry that is suitable for transmitting and/or receiving a radio frequency (RF) signal. The storage unit 250 may be embodied, for example, as a flash memory, a read-only memory (ROM), a compact disk ROM (CD-ROM), a random access memory (RAM), an erasable programmable ROM (EPROM), an electronically erasable and programmable ROM (EEPROM), a register, a hard disk, a removable disk, a memory card, a universal serial bus (USB) memory, or any type of non-volatile memory.

The receiving unit 210 selects a channel and receives from the selected channel a broadcast signal which includes a plurality of frames. The broadcast signal may be a standard signal which uses digital image compression technology, such as, for example, Moving Picture Experts Group (MPEG) or H.264, wherein the standard signal includes a plurality of groups of pictures (GOPs), each including one or more intra (I) pictures, one or more predictive (P) pictures, and one or more bidirectionally predictive (B) pictures. The I picture is a picture that can be encoded by using pixels within the current frame, without using interframe motion-compensated predictive coding (MCPC). The P picture is a unidirectionally predictive frame and can be encoded by interframe MCPC with reference to a previous I picture or a previous P picture. Lastly, the B picture is a bidirectionally predictive frame and can be encoded by MCPC in a forward temporal direction, a backward temporal direction, or in both temporal directions, with reference to an I picture or a P picture located temporally before the B picture, or with reference to I pictures or P pictures located temporally before and after the B picture. Among the I, P and B pictures, the B picture represents the best compression efficiency. A GOP which includes the I, P and B pictures is a group of a plurality of frames arranged in a predetermined order, such as, for example, in an order corresponding to a temporal order of the I, P, and B pictures.

The signal processing unit 220 receives the broadcast signal from the receiving unit 210 and processes the received broadcast signal according to a control command provided by the control unit 230. In particular, the signal processing unit 220 demodulates and equalizes the broadcast signal encoded and received by the receiving unit 210 in order to restore the received broadcast signal to its original form. Then, the signal processing unit 220 decodes the demodulated and equalized broadcast signal such that frames of the decoded broadcast signal may be displayed on a screen. Subsequently, when a user inputs channel change command information, the communication unit 240 receives, from an external device, an encoded reference frame of a channel corresponding to the input channel change command information based on a control command provided by the control unit 230.

The encoded reference frame, which is received from the external device through the communication unit 240, is then stored in the storage unit 250, based on a control command provided by the control unit 230. The storage unit 250 that stores the encoded reference frame includes a first storage unit 251 and a second storage unit 252. In accordance with a control command of the control unit 230, the first storage unit 251 stores the reference frame and frames of a broadcast signal relating to the reference frame. According to an exemplary embodiment, the reference frame may be encoded on a GOP-by-GOP basis and stored in the first storage unit 251. In addition, the frames of the broadcast signal related to the reference frame may be encoded on a GOP-by-GOP basis and stored in the first storage unit 251.

In accordance with a control command provided by the control unit 230, the second storage unit 252 stores a data-related frame which is processed by the signal processing unit 220. According to an exemplary embodiment, the signal processing unit 220 may decode the encoded reference frame stored in the first storage unit 251 or an encoded frame of the broadcast signal relating to the reference frame, and store the decoded reference frame or the decoded frame of the broadcast signal in the second storage unit 252 as the data-related frame. However, the present inventive concept is not limited thereto; for example, the signal processing unit 220 may encode the decoded reference frame or encode the decoded frames of the broadcast signal relating to the reference frame on a GOP-by-GOP basis, and store the encoded frame or frames in the second storage unit 252. Therefore, depending on signal processing operations performed by the signal processing unit 220, the second storage unit 252 may store the decoded reference frame or each decoded frame of the broadcast signal relating to the reference frame. Alternatively, all frames, including the decoded reference frame, may be encoded on a GOP-by-GOP basis by the signal processing unit 220 and then stored in the second storage unit 252.

When channel change command information is received from a user, the signal processing unit 220, based on a control command provided by the control unit 230, starts to decode a broadcast signal received from another channel, beginning with a frame corresponding to a time when the channel change command information was received, by using an encoded reference frame stored in the first storage unit 251. More specifically, when channel change command information is received from a user, the receiving unit 210 receives a broadcast signal, which is provided on a channel that corresponds to the received channel change command information, and stores the received broadcast signal in the first storage unit 251 in accordance with a control command provided by the control unit 230. While the receiving unit 210 receives the broadcast signal, the communication unit 240 receives, from an external device, at least one encoded reference frame which is used to decode a frame corresponding to a time when the channel change command information was received, and stores the received reference frame in the first storage unit 251. Accordingly, the signal processing unit 220 decodes the encoded reference frame stored in the first storage unit 251 and generates a frame corresponding to the time when the channel change command information was received by using the decoded reference frame. The signal processing unit 220 decodes the frame generated by using the reference frame, so that the generated frame can be displayed on the screen. Then, the signal processing unit 220 decodes frames of the broadcast signal received from the receiving unit 210 and stored in the first storage unit 251, so that the decoded frames can be sequentially displayed on the screen. Consequently, the user can change to a desired channel and watch the desired channel with a minimal delay.

The control unit 230 may search for an external device which stores a reference frame according to the following exemplary embodiments. In an exemplary embodiment, when channel change command information is received from a user, the control unit 230 searches accessible external devices for an external device which has selected and is playing a channel relating to the received channel change command information, or for an external device which stores a reference frame of the corresponding channel. Specifically, by using the communication unit 230, the control unit 230 transmits reference frame request information which contains the channel change command information that was received from the user to external devices that can perform data communication with the broadcast receiving device. Then, the control unit 230 receives response information from the external devices which received the reference frame request information, via the communication unit 230 and, based on the received response information, searches for and determines an external device for which a currently selected channel is a channel relating to the channel change command information or which stores a reference frame of the channel.

After determining a suitable external device, the control unit 230 may use the communication unit 240 to transmit a request for the respective reference frame to the determined external device, and also to receive the requested reference frame from the determined external device.

In another exemplary embodiment, when channel change command information is received from a user, the control unit 230 may check channel selection information of each external device by using the communication unit to periodically perform data communication with the accessible external devices, and, using the periodic communications, search for an external device which can provide a reference frame of a channel relating to the received channel change command information. Specifically, the control unit 230 obtains channel selection information from each respective external device by periodically performing data communication with the external devices via the communication unit 240, and stores the obtained channel selection information in the first storage unit 251 or the second storage unit 252. Then, when channel change command information is received from a user, the control unit 230 determines an external device which can provide a reference frame of a channel relating to the received channel change command information by referring to the channel selection information obtained from each respective external device. When a suitable external device is determined, the communication unit 240 may request the corresponding reference frame from the determined external device, and receive the reference frame from the determined external device, based on a control command provided by the control unit 230.

In another exemplary embodiment, when channel change command information is received from a user, the control unit 230 uses the communication unit 240 to request information relating to an external device which can provide a reference frame of a channel corresponding to the channel change command information from a server which stores channel selection information relating to each of a plurality of external devices. Accordingly, the information relating to the suitable external device is received from the server via the communication unit 240. Then, the communication unit 240 may request the reference frame from the external device corresponding to the received information, and, in response to the request, receive the reference frame from the external device in accordance with a control command provided by the control unit 230.

The communication unit 240 may then receive a sequence of pictures from the external device, depending on a time when the channel change command information is received. Specifically, when a frame corresponding to a time when channel change command information was received from a user includes a P picture, the communication unit 240 receives, from the identified external device, one of an I picture located temporally before the included P picture in a corresponding GOP and another P picture as a reference frame.

When the frame corresponding to the time when the channel change command information was received from the user includes a B picture, the communication unit 240 receives, from the determined external device, one of an I picture and a P picture located temporally before the included B picture in the corresponding GOP as a reference frame. However, the present inventive concept is not limited thereto. For example, when the frame corresponding to the time when the channel change command information was received from the user includes a B picture, the communication unit 240 may receive, from the determined external device, one or more I pictures or P pictures located temporally before and after the included B picture in the corresponding GOP as reference frames.

When the frame corresponding to the time when the channel change command information was received from the user is an I picture, the communication unit 240 receives no reference frame from the determined external device.

The operation of receiving a reference frame relating to a frame corresponding to a time when channel change command information was received will now be described in greater detail with reference to FIG. 3.

Figure 3:
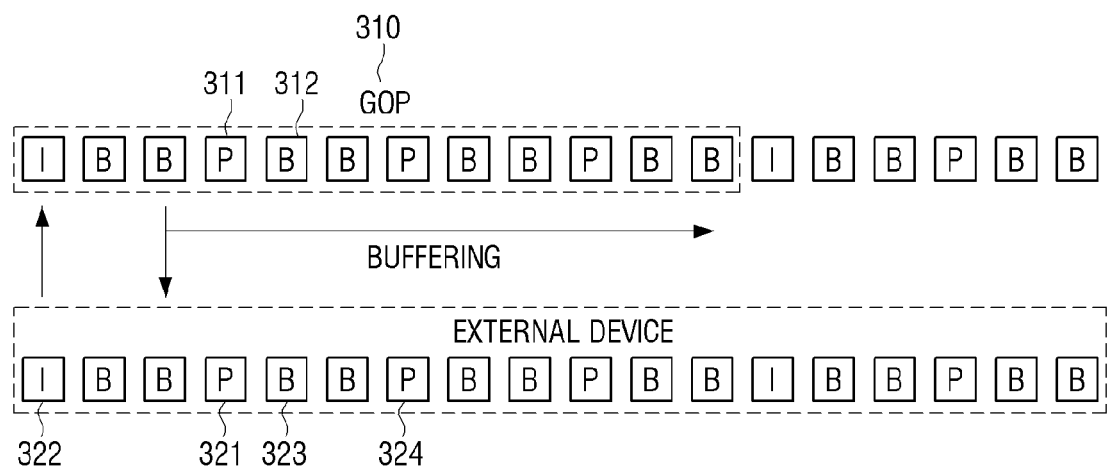
FIG. 3 is a diagram which illustrates a case in which the broadcast receiving device shown in FIG. 2 receives a reference frame relating to a frame that corresponds to a time when channel change command information was received.

FIG. 3 is a diagram illustrating a case in which the broadcast receiving device illustrated in FIG. 2 receives a reference frame relating to a frame corresponding to a time when channel change command information was received.

Referring to FIG. 3, while a decoded P picture 311 from a group of pictures 310 is being displayed on the screen, the channel change command information may be received from the user. When the channel change command information is received from the user while the decoded P picture 311 is being displayed, the receiving unit 210 receives a broadcast signal of a channel corresponding to the received channel change command information and stores the received broadcast signal based on a control command provided by the control unit 230. At the same time, the communication unit 240 requests a reference frame relating to a frame corresponding to the time when the channel change information was received from an external device for which a currently selected channel is the channel corresponding to the received channel change command information or which stores a reference frame relating to frames of the channel. For example, when the frame corresponding to the time when the channel change command information was received is the P picture 311, the communication unit 240 requests a reference frame relating to the P picture 311 from the external device. Accordingly, the external device determines that a frame corresponding to the time of the P picture 311 is a P picture 321, and therefore transmits an I picture 322, which is a reference frame relating to the P picture 321, to the broadcast receiving device.

When the frame corresponding to the time when the channel change command information was received is a B picture 312, the communication unit 240 requests a reference frame relating to the B picture 312 from the external device. Accordingly, the external device determines that a frame corresponding to the time of the B picture 312 is a B picture 323, and therefore transmits the P picture 321, which is related to the B picture 323 and located temporally before the B picture 323, to the broadcast receiving device, or transmits P pictures 321 and 324, each of which is related to the B picture 323, and which are respectively located before and after the B picture 323, to the broadcast receiving device.

When the reference frame corresponding to the time when the channel change command information was received is received as described above, the communication unit 240 stores the received reference frame in the first storage unit 251 in accordance with a control command provided by the control unit 230. Then, the signal processing unit 220 decodes the P picture 321 by using the I picture 322, and/or decodes the B picture 323 by using the P picture 321 or the P pictures 321 and 324, based on a control command provided by the control unit 230. Subsequently, the signal processing unit 220 decodes frames of the broadcast signal of the channel corresponding to the channel change command information which were received through the receiving unit 210 and stored in the first storage unit 251. As described above, while a broadcast signal of a channel corresponding to channel change command information is being received, the signal processing unit 220 decodes frames of the broadcast signal by using a reference frame received from an external device from a frame corresponding to a time when the channel change command information was received, so that the frames of the broadcast signal can be displayed on the screen from the frame corresponding to the time when the channel change command information was received. Therefore, the time required to change channels can be reduced, and frames relating to a corresponding channel can be displayed on the screen from a time when a channel change request is received.

As described above, the second storage unit 252 stores data processed by the signal processing unit 220, that is, decoded frames, based on a control command provided by the control unit 230. In particular, the signal processing unit 220 may encode the decoded frames on a GOP-by-GOP basis and store the encoded frames in the second storage unit 252. Therefore, when frame provision request information is received from another (second) broadcast receiving device via the communication unit 240, the control unit 230 obtains, from data stored in the second storage unit 252, a frame relating to the frame provision request information received from the second broadcast receiving device. The obtained frame is a reference frame, and this reference frame is an encoded frame. When the encoded reference frame is obtained, the communication unit 240 may transmit the obtained reference frame to the broadcast receiving device that transmitted the frame provision request information based on a control command provided by the control unit 230.

Each element of the broadcast receiving device, according to one or more exemplary embodiments, has been described above in detail. Hereinafter, a method by which the broadcast receiving device, according to one or more exemplary embodiments, operates in response to a channel change request will be described in detail.

Figure 4:
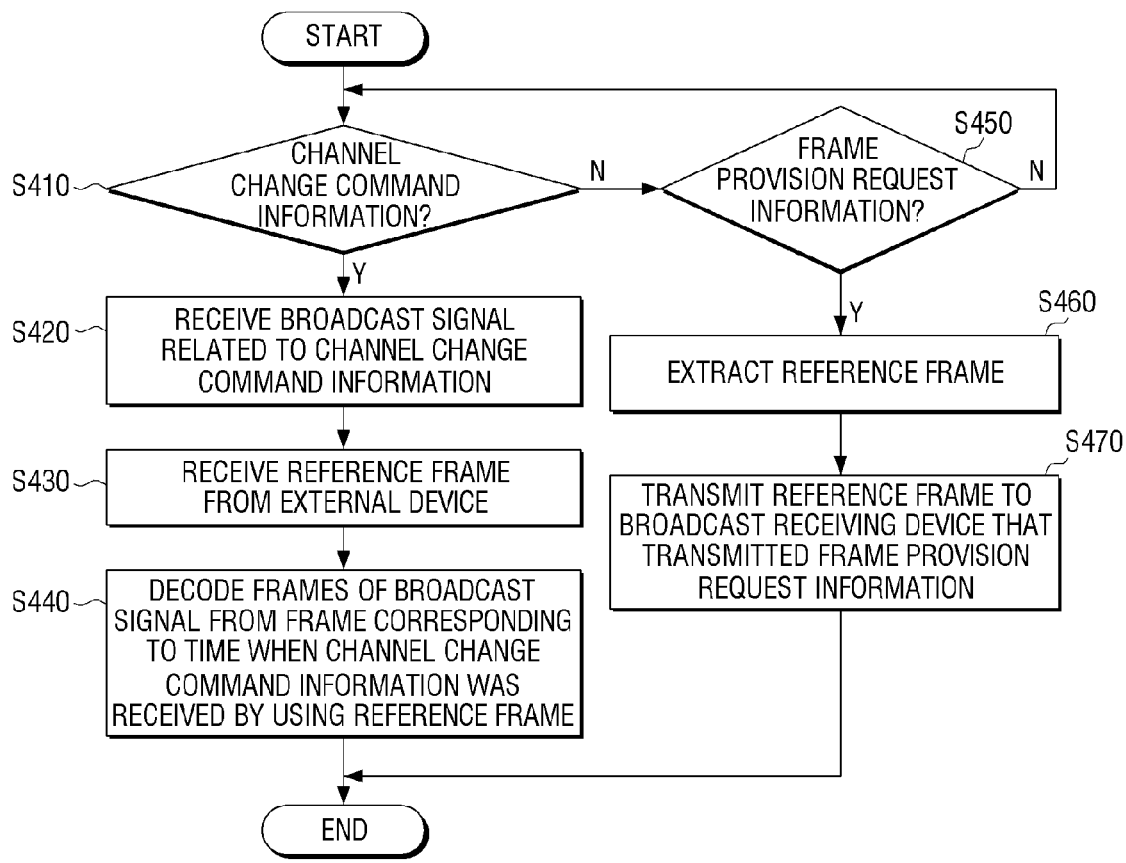
FIG. 4 is a flowchart illustrating a broadcast receiving method used by a broadcast receiving device according to an exemplary embodiment.

FIG. 4 is a flowchart illustrating a broadcast receiving method used by a broadcast receiving device according to an exemplary embodiment.

Referring to FIG. 4, while a decoded frame relating to a selected channel is being displayed on the screen, the broadcast receiving device checks whether received information includes channel change command information received from a user (operation S410). When determining that the received information includes the channel change command information received from the user, the broadcast receiving device selects a channel corresponding to the received channel change command information and receives from the selected channel a broadcast signal that includes a plurality of frames (operation S420). In particular, the broadcast signal may be a standard signal that uses digital image compression technology, such as, for example, MPEG or H.264, wherein the standard signal includes a plurality of GOPs, each GOP including at least one I picture, at least one P picture, and at least one B picture. The I picture is a picture that can be encoded using pixels within the current frame, without using interframe MCPC. The P picture is a unidirectionally predictive frame and can be encoded by interframe MCPC with reference to a previous I picture or a previous P picture. Lastly, the B picture is a bidirectionally predictive frame and can be encoded by MCPC in a forward temporal direction, a backward temporal direction, or both temporal directions with reference to an I picture or a P picture located temporally before the B picture or with reference to I pictures or P pictures respectively located temporally both before and after the B picture.

Among the I pictures, the P pictures, and the B pictures, the B picture represents the best compression efficiency. A GOP which includes at least one of each of the I, P and B pictures is a group of a plurality of frames arranged in a predetermined order, such as, for example, in an order corresponding to a temporal order of the I, P, and B pictures.

When the frames of the broadcast signal of the channel corresponding to the channel change command information received from the user are received, the broadcast receiving device stores the received frames of the broadcast signal. The broadcast receiving device then receives, from an external device, at least one reference frame which is used to decode a frame corresponding to a time when the channel change command information was received from among the received frames of the broadcast signal (operation S430).

In particular, the external device is an external device for which a currently selected channel is the channel corresponding to the channel change command information, or which has encoded the frames related to the channel on a GOP-by-GOP basis and stored the encoded frames. Therefore, the broadcast receiving device may search for and determine a suitable external device, in accordance with the above description, and receive from the determined external device a reference frame to be used for decoding the frames of the channel corresponding to the channel change command information. Methods used by the broadcast receiving device to search for and determine an external device whose currently selected channel is a channel corresponding to channel change command information or which stores frames related to the channel will be described in detail below.

When at least one reference frame is received from the determined external device in operation S430, the broadcast receiving device starts to decode the frames of the broadcast signal by using the reference frame relating to the frame corresponding to the time when the channel change command information was received (operation S440). More specifically, while the frames of the broadcast signal of the channel corresponding to the received channel change command information are being received, the broadcast receiving device receives, from the determined external device, a reference frame that is used to decode the frame corresponding to the time when the channel change command information was received. As described above, when the frame corresponding to the time when the channel change command information was received from the user includes a P picture, the broadcast receiving device receives, from the determined external device, one of an I picture located temporally before the included P picture in a corresponding GOP and another P picture as a reference frame.

When the frame corresponding to the time when the channel change command information was received from the user includes a B picture, the broadcast receiving device receives, from the determined external device, one of an I picture and a P picture located temporally before the included B picture in the corresponding GOP as a reference frame. However, the present inventive concept is not limited thereto. For example, when the frame corresponding to the time when the channel change command information was received from the user includes a B picture, the broadcast receiving device may receive, from the determined external device, I pictures or P pictures located temporally both before and after the included B picture in the corresponding GOP as reference frames. When the frame corresponding to the time when the channel change command information was received from the user includes an I picture, the broadcast receiving device receives no reference frame from the determined external device.

For example, referring to FIG. 3, when the frame corresponding to the time when the channel change command information was received is the P picture 311, the broadcast receiving device requests a reference frame relating to the P picture 311 from the determined external device. Accordingly, the external device determines that a frame corresponding to the P picture 311 includes the P picture 321, and thusly transmits the I picture 322, which is a reference frame relating to the P picture 321, to the broadcast receiving device. Hence, the broadcast receiving device can receive, from the determined external device, the I picture 322, which is a reference frame corresponding to the time when the channel change command information was received.

In another example, referring to FIG. 3, when the frame corresponding to the time when the channel change command information was received from the user includes the B picture 312, the broadcast receiving device requests a reference frame relating to the B picture 312 from the determined external device. Accordingly, the external device determines that a frame corresponding to the B picture 312 includes the B picture 323, and thusly transmits the P picture 321 relating to the B picture 323 and located temporally before the B picture 323, or transmits the P pictures 321 and 324, each of which relates to the B picture 323 and which are respectively located before and after the B picture 323, to the broadcast receiving device.

A reference frame which is received from the external device to decode the frame corresponding to the time when the channel change command information was input is an encoded frame. Upon receiving the encoded reference frame, the broadcast receiving device decodes the received encoded reference frame and generates a frame corresponding to the time when the channel change command information was received by using the decoded reference frame. Then, the broadcast receiving device decodes the generated frame so that the decoded frame can be displayed on the screen. Subsequently, the broadcast receiving device decodes received and stored frames of the broadcast signal, so that the decoded frames can be sequentially displayed on the screen.

As described above, while a broadcast signal of a channel corresponding to channel change command information is being received, the broadcast receiving device decodes frames of the broadcast signal by using a reference frame received from an external device and relating to a frame corresponding to a time when the channel change command information was received, so that the decoded frames of the broadcast signal can be displayed on the screen from the frame corresponding to the time when the channel change command information was received. Therefore, the time required to change channels can be reduced, and frames relating to a corresponding channel can be displayed on the screen from a time when channel change command information is received. Hence, while watching a selected channel on the screen, a user can change to a desired channel and watch the desired channel with a minimal delay.

Figure 5:
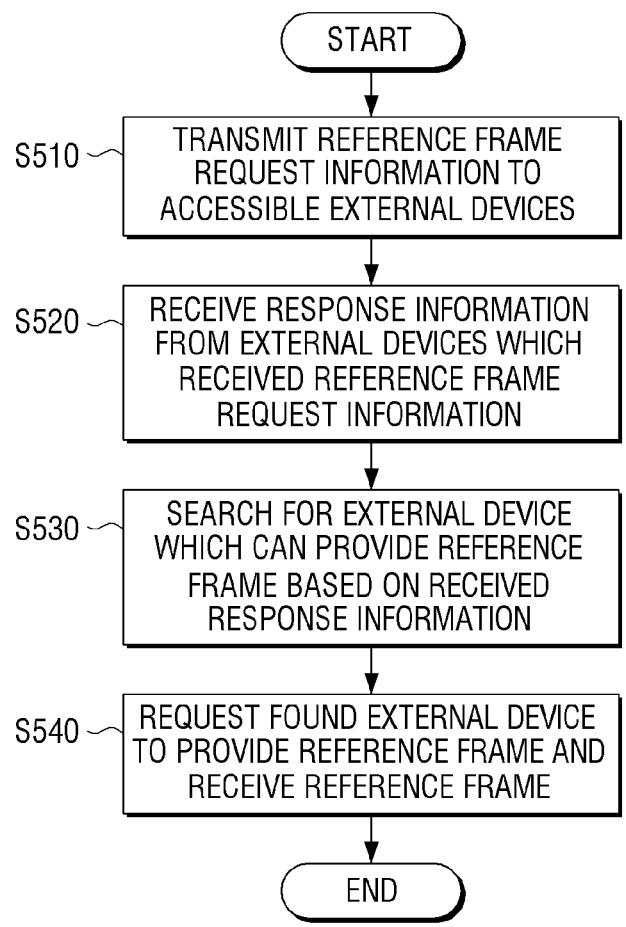
FIG. 5 is a flowchart illustrating a method by which a broadcast receiving device receives a reference frame from a determined external device according to an exemplary embodiment.
Figure 6:
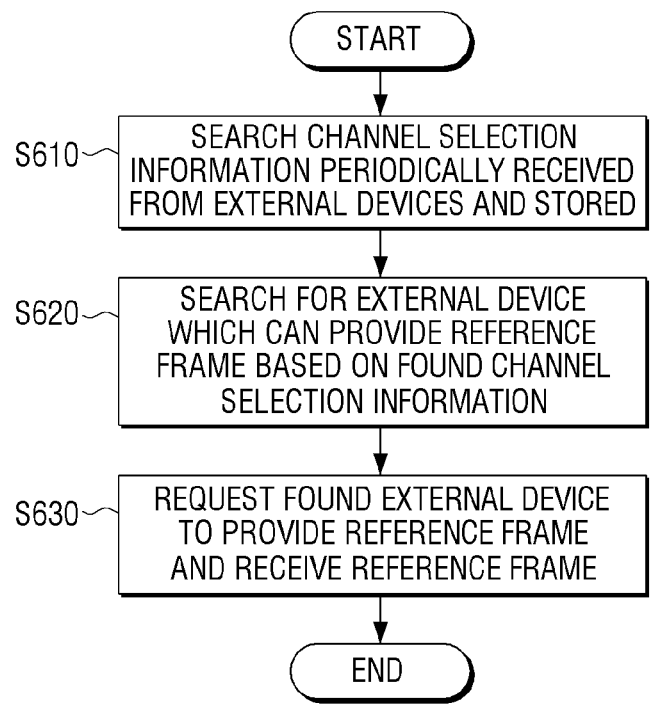
FIG. 6 is a flowchart illustrating a method by which a broadcast receiving device receives a reference frame from a determined external device according to another exemplary embodiment.
Figure 7:
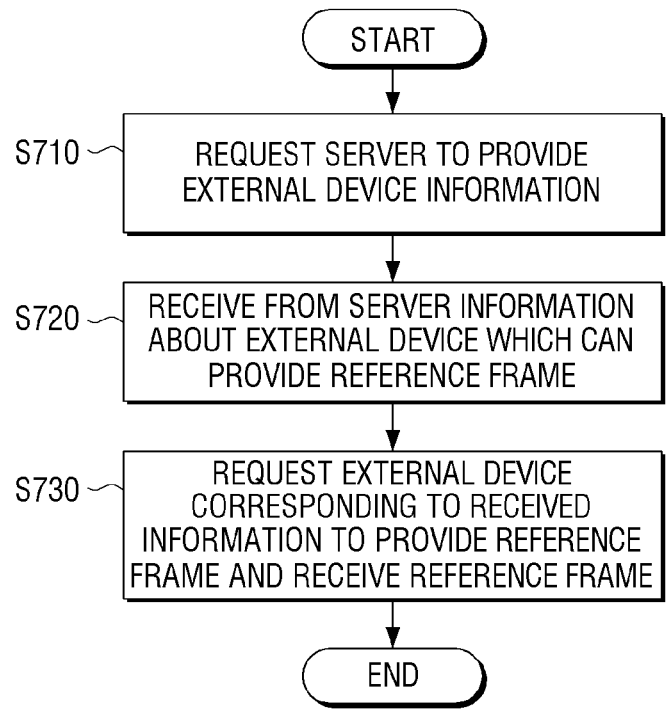
FIG. 7 is a flowchart illustrating a method by which a broadcast receiving device receives a reference frame using external device information received from a server according to another exemplary embodiment.

The broadcast receiving device may search for and determine an external device as illustrated in FIGS. 5 through 7. First, the broadcast receiving device may transmit a request, in a broadcast manner, to all external devices with which the broadcast receiving device can perform data communication to provide a reference frame, and then receive the requested reference frame.

FIG. 5 is a flowchart illustrating a method by which a broadcast receiving device receives a reference frame from a determined external device according to an exemplary embodiment.

Referring to FIG. 5, when channel change command information is received from a user, the broadcast receiving device searches accessible external devices for an external device which has selected and is playing a channel related to the channel change command information, or for an external device which stores a reference frame of the corresponding channel. Specifically, the broadcast receiving device transmits, in a broadcast manner, reference frame request information which contains the channel change command information received from the user to any accessible external devices (operation S510). Then, the broadcast receiving device receives response information from at least one of the external devices which received the reference frame request information (operation S520). When the response information is received from the at least one of the external devices which received the reference frame request information, the broadcast receiving device searches for and determines an external device which can provide a suitable reference frame based on the received response information (operation S530).

After determining the external device which can provide the reference frame, the broadcast receiving device requests the reference frame from the determined external device, and then receives the requested reference frame from the determined external device (operation S540). As described above, when an external device for which a currently selected channel is a channel related to channel change command information or which stores a reference frame of the channel is determined by using a broadcast method, the broadcast receiving device may transmit a request to the determined external device to provide the reference frame to be used for decoding a frame corresponding to a time when the channel change command information was received, and then receive the reference frame from the determined external device.

The broadcast receiving device may also request and receive a reference frame to be used for decoding a frame, which corresponds to a time when channel change command information was received, as illustrated in FIG. 6.

FIG. 6 is a flowchart illustrating a method by which a broadcast receiving device receives a reference frame from a determined external device according to another exemplary embodiment.

Referring to FIG. 6, when channel change command information is received from a user, the broadcast receiving device searches channel selection information obtained by periodically performing data communication with external devices (operation S610). Specifically, the broadcast receiving device receives and stores the channel selection information corresponding to each external device by periodically performing data communication with the respective external devices. Thus, when the channel change command information is received from the user, the broadcast receiving device may search the stored channel selection information corresponding to each external device for channel selection information related to the received channel change command information. When the channel selection information related to the channel change command information is found, the broadcast receiving device searches for and determines an external device which can provide a reference frame of a channel related to the channel change command information by referring to the found channel selection information (operation S620).

When the external device which can provide the reference frame is determined, the broadcast receiving device requests the reference frame from the determined external device, and then receives the requested reference frame from the determined external device (operation S630). As described above, the broadcast receiving device may receive and store channel selection information corresponding to each external device by periodically performing data communication with the respective external devices; search for a suitable external device, which can provide a reference frame to be used for decoding a frame corresponding to a time when channel change command information was received, by referring to the stored channel selection information; and then request and receive the reference frame from the determined external device.

As illustrated in FIG. 7, the broadcast receiving device may also receive information relating to an external device from a server, and then receive a reference frame to be used for decoding a frame corresponding to a time when channel change command information was received from the external device corresponding to the information received from the server.

FIG. 7 is a flowchart illustrating a method by which a broadcast receiving device receives a reference frame by using external device information received from a server, according to another exemplary embodiment.

Referring to FIG. 7, when channel change command information is received from a user, the broadcast receiving device requests external device information from a server (operation S710), which server stores channel selection information corresponding to each of a plurality of external devices, and then receives the requested external device information from the server (operation S720). In particular, the broadcast receiving device requests, from the server, information relating to an external device for which a currently selected channel is a channel corresponding to the received channel change command information or which stores frames of the corresponding channel. Accordingly, the server extracts the information relating to a suitable external device from the stored channel selection information corresponding to each respective external device, and transmits the extracted information to the broadcast receiving device.

Then, the broadcast receiving device requests, from the external device corresponding to the received information, a reference frame to be used for decoding a frame corresponding to the time when the channel change command information was received, and then receives the requested reference frame from the external device (operation S730). As described above, the broadcast receiving device may receive information relating to an external device from a server which stores channel selection information corresponding to each external device, transmit a request to the external device corresponding to the received information to provide the reference frame to be used for decoding a frame corresponding to a time when channel change command information was received, and then receive the requested reference frame from the external device.

Referring again to FIG. 4, when a determination is made that the received information does not include the channel change command information in operation S410, the broadcast receiving device checks whether the received information includes frame provision request information (operation S450). When determining that the input information includes the frame provision request information, the broadcast receiving device extracts a reference frame which is useable by an external device, i.e., another broadcast receiving device, from data processed and stored in advance (operation S460). Specifically, the broadcast receiving device encodes frames, which have been decoded for display on the screen, on a GOP-by-GOP basis, and stores the encoded frames in a storage unit. In particular, frames corresponding to a channel selected by a user are encoded on a GOP-by-GOP basis and stored in the storage unit. Because the frames corresponding to the selected channel are encoded and stored in the storage unit, when frame provision request information is received from an external device, a frame corresponding to the received frame provision request information can be obtained from the storage unit. The broadcast receiving device uses the obtained frame to extract a reference frame, which is one of a frame located temporally before the obtained frame, or respective frames which are located both temporally before and after the obtained frame. Then, the broadcast receiving device transmits the extracted reference frame or frames to the external device.

Accordingly, the external device which transmitted the frame provision request information receives the reference frame from the broadcast receiving device, decodes a frame corresponding to a time when channel change command information was received from a user by using the received reference frame, and displays the decoded frame on the screen.

The above-described broadcast receiving methods according to various exemplary embodiments can be embodied as program code stored in various types of recording media and executable by a central processing unit (CPU) of various electronic devices.

Specifically, the code for executing the above-described methods may be stored in various types of terminal-readable recording media, such as, for example, random access memories (RAMs), flash memories, read-only memories (ROMs), erasable programmable ROMs (EPROMs), electronically erasable and programmable ROMs (EEPROMs), registers, hard disks, removable disks, memory cards, universal serial bus (USB) memories, and compact disc ROMs (CD-ROMs).

Although a few exemplary embodiments have been shown and described, it will be appreciated by those skilled in the art that various changes in form and details may be made with respect to the exemplary embodiments without departing from the principles and spirit of the present disclosure, the scope of which is defined in the appended claims and their equivalents.

What is claimed is:

1. A broadcast receiving device comprising:
a receiver which selects a channel and receives a first broadcast signal that includes a plurality of frames;
a signal processor which processes the first broadcast signal;
a controller which controls the receiver to select another channel when a channel change command is received;
a communication component which receives, from an external device, at least one reference frame from among frames of a second broadcast signal received from the another channel, wherein the at least one reference frame relates to a frame from the first broadcast signal that corresponds to a time when the channel change command was received; and
a storage component which stores the received at least one reference frame,
wherein when the channel change command is received, the receiver receives the second broadcast signal which is provided on the another channel which corresponds to the received channel change command and stores the received second broadcast signal in the storage component, and the signal processor decodes the frames of the second broadcast signal by using the at least one reference frame, and
wherein when the channel change command is received, the controller determines an external device which has selected and is playing the another channel or which stores a reference frame of the another channel, and uses the communication component to request the at least one reference frame from the determined external device.

2. The broadcast receiving device as claimed in claim 1, wherein the first broadcast signal uses digital image compression technology and includes a plurality of groups of pictures (GOPs), wherein each GOP includes at least one intra (I) picture, at least one predictive (P) picture, and at least one bi-directional prediction (B) picture, and wherein, when the frame corresponding to the time when the channel change command was received includes a P picture, the communication component receives one of an I picture located temporally before the included P picture in a corresponding GOP and another P picture as the at least one reference frame.

3. The broadcast receiving device as claimed in claim 2, wherein when the frame corresponding to the time when the channel change command was received includes a B picture, the communication component receives one of an I picture and a P picture located temporally before the B picture in the corresponding GOP as the at least one reference frame.

4. The broadcast receiving device as claimed in claim 2, wherein the controller determines an external device which can provide the at least one reference frame of the another channel by checking channel selection information periodically received from external devices connected to the communication component, and uses the communication component to request the at least one reference frame from the determined external device.

5. The broadcast receiving device as claimed in claim 2, wherein when the channel change command is received, the controller requests information relating to an external device which can provide the at least one reference frame of the another channel from a server, receives the requested information from the server, and uses the communication component to request the at least one reference frame from the external device corresponding to the received information.

6. The broadcast receiving device as claimed in claim 1, wherein the storage component comprises:
a first storage section which stores the at least one reference frame and frames of a broadcast signal relating to the at least one reference frame; and
a second storage section which stores data processed by the signal processor,
wherein, when a frame provision request is received from another broadcast receiving device, the controller controls the communication component to extract an encoded reference frame relating to the received frame provision request from the data stored in the second storage section and to transmit the encoded reference frame to the another broadcast receiving device.

7. A broadcast receiving method comprising:
receiving a channel change command;
selecting a channel based on the received channel change command and receiving a broadcast signal that includes a plurality of frames and that is provided on the selected channel, and storing the received broadcast signal;

receiving, from an external device, at least one reference frame from among the frames of the received broadcast signal, wherein the at least one reference frame relates to a frame included in the broadcast signal that corresponds to a time when the channel change command was received; and decoding the frames of the received broadcast signal by using the received at least one reference frame, wherein the receiving of the at least one reference frame comprises:

requesting information relating to an external device which can provide the at least one reference frame of the channel from a server when the channel change command is received;

receiving the requested information from the server; and requesting the at least one reference frame from the external device corresponding to the received information.

8. The broadcast receiving method as claimed in claim 7, wherein the broadcast signal uses digital image compression technology and includes a plurality of groups of pictures (GOPs), wherein each of the plurality of GOPs includes at least one intra (I) picture, at least one predictive (P) picture, and at least one bi-directional prediction (B) picture.

9. The broadcast receiving method as claimed in claim 8, wherein the receiving of the at least one reference frame comprises:

determining an external device which has selected and is playing the channel or which stores a reference frame of the channel when the channel change command is received; and requesting the at least one reference frame from the determined external device.

10. The broadcast receiving method as claimed in claim 8, wherein the receiving of the at least one reference frame comprises:

determining an external device which can provide the at least one reference frame of the channel by checking channel selection information periodically received from external devices when the channel change command is received; and requesting the at least one reference frame from the determined external device.

11. The broadcast receiving method as claimed in claim 9, wherein the requesting the at least one reference frame from the determined external device comprises: when the frame corresponding to the time when the channel change command was received includes a P picture, requesting one of an I picture located temporally before the included P picture in a corresponding GOP and another P picture from the determined external device.

12. The broadcast receiving method as claimed in claim 11, wherein the requesting the at least one reference frame from the determined external device comprises: when the frame corresponding to the time when the channel change command was received includes a B picture, requesting one of an I picture and a P picture located temporally before the included B picture in the corresponding GOP from the determined external device.

13. The broadcast receiving method as claimed in claim 8, further comprising:

extracting an encoded reference frame relating to a frame provision request from stored data when the frame provision request is received from another broadcast receiving device; and transmitting the extracted reference frame to the another broadcast receiving device.

14. A non-transitory computer-readable recording medium on which a program for executing a channel changing method for use by a broadcast receiving device is recorded, wherein the channel changing method comprises:

receiving a channel change command;

selecting a channel based on the received channel change command;

receiving a broadcast signal that includes a plurality of frames and that is provided on the selected channel, and storing the received broadcast signal;

receiving, from an external device, at least one reference frame from among the frames of the received broadcast signal, wherein the at least one reference frame relates to a frame that corresponds to a time when the channel change command was received; and decoding the frames of the received broadcast signal by using the received at least one reference frame, wherein the receiving of the at least one reference frame comprises:

requesting information relating to an external device which can provide the at least one reference frame of the channel from a server when the channel change command is received;

receiving the requested information from the server; and requesting the at least one reference frame from the external device corresponding to the received information.

15. The recording medium as claimed in claim 14, wherein the broadcast signal uses digital image compression technology and includes a plurality of groups of pictures (GOPs), wherein each of the plurality of GOPs comprises at least one intra (I) picture and at least one predictive (P) picture and at least one bi-directional prediction (B) picture, and wherein the channel changing method further comprises: when the frame corresponding to the time when the channel change command was received includes a P picture, requesting one of an I picture located temporally before the included P picture in a corresponding GOP and another P picture from the external device, and, when the frame corresponding to the time when the channel change command was received includes a B picture, requesting one of an I picture and a P picture located temporally before the included B picture in the corresponding GOP from the external device.

* * * * *